US008063967B2

(12) United States Patent
Itano et al.

(10) Patent No.: US 8,063,967 B2
(45) Date of Patent: Nov. 22, 2011

(54) SOLID-STATE IMAGE SENSOR AND IMAGING SYSTEM

(75) Inventors: Tetsuya Itano, Zama (JP); Tomoyuki Noda, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/888,503

(22) Filed: Sep. 23, 2010

(65) Prior Publication Data

US 2011/0013042 A1 Jan. 20, 2011

Related U.S. Application Data

(62) Division of application No. 11/960,886, filed on Dec. 20, 2007, now Pat. No. 7,825,974.

(30) Foreign Application Priority Data

Dec. 28, 2006 (JP) .................................. 2006-356089

(51) Int. Cl.
| | |
|---|---|
| H04N 3/14 | (2006.01) |
| H04N 5/217 | (2011.01) |
| H04N 9/64 | (2006.01) |
| H04N 5/335 | (2011.01) |
| H01L 27/00 | (2006.01) |

(52) U.S. Cl. ........ 348/308; 348/241; 348/248; 348/296; 250/208.1

(58) Field of Classification Search .................. 348/241, 348/243, 294–324, 248; 250/208.1, 214.1, 250/214 R; 257/257, 291, 83, 80, 113, 444, 257/442, 462
See application file for complete search history.

(56) References Cited

U.S. PATENT DOCUMENTS

| 6,043,478 | A | * | 3/2000 | Wang ......................... 250/208.1 |
| 6,320,616 | B1 | * | 11/2001 | Sauer ............................. 348/241 |
| 7,116,365 | B1 | | 10/2006 | Ueno et al. ..................... 348/308 |
| 7,187,020 | B2 | | 3/2007 | Mabuchi ........................ 257/257 |
| 7,268,331 | B2 | | 9/2007 | Koyama ...................... 250/208.1 |
| 7,277,130 | B2 | * | 10/2007 | Korthout et al. .............. 348/308 |
| 7,462,810 | B2 | * | 12/2008 | Kobayashi et al. ......... 250/208.1 |
| 7,525,585 | B2 | * | 4/2009 | Murakami et al. ............ 348/294 |
| 7,825,974 | B2 | * | 11/2010 | Itano et al. .................... 348/308 |
| 2005/0023532 | A1 | | 2/2005 | Mabuchi .......................... 257/72 |
| 2005/0269607 | A1 | * | 12/2005 | Henderson .................... 257/292 |
| 2006/0001751 | A1 | | 1/2006 | Abe et al. ....................... 348/300 |
| 2006/0102827 | A1 | | 5/2006 | Kasuga et al. .............. 250/208.1 |
| 2006/0158540 | A1 | | 7/2006 | Murakami et al. ............ 348/308 |

(Continued)

FOREIGN PATENT DOCUMENTS

EP 1 599 039 A1 11/2005

(Continued)

*Primary Examiner* — Lin Ye
*Assistant Examiner* — Marly Camargo
(74) *Attorney, Agent, or Firm* — Fitzpatrick, Cella, Harper & Scinto (57) ABSTRACT

Each pixel includes a photo-electric converter, transfer switch, charge-voltage conversion node, amplifier, and control switch. A solid-state image sensor includes a voltage controller which controls the voltage of the charge-voltage conversion node of each pixel via the control switch of the pixel. A voltage set at the charge-voltage conversion node by the voltage controller via the control switch includes a first voltage (VD_1) for setting a pixel in a selected state, and a second voltage (VD_2) for setting the pixel in an unselected state. The voltage controller and the control switch of each pixel set the voltage of the charge-voltage conversion node of each pixel to the second voltage (VD_2) by using at least part of the horizontal scanning period.

3 Claims, 9 Drawing Sheets

U.S. PATENT DOCUMENTS

| | | | |
|---|---|---|---|
| 2006/0175536 A1 | 8/2006 | Kim et al. | 250/208.1 |
| 2006/0203114 A1 | 9/2006 | Xu | 348/308 |
| 2007/0024726 A1 | 2/2007 | Nomoto et al. | 348/348 |
| 2008/0029689 A1 | 2/2008 | Kobayashi et al. | 250/208.1 |
| 2008/0030612 A1* | 2/2008 | Itano et al. | 348/340 |
| 2008/0036891 A1* | 2/2008 | Ono et al. | 348/308 |
| 2008/0211950 A1* | 9/2008 | Ono et al. | 348/308 |
| 2010/0097508 A1* | 4/2010 | Yanagita et al. | 348/301 |

FOREIGN PATENT DOCUMENTS

| | | |
|---|---|---|
| JP | 11-355668 A | 12/1999 |
| JP | 2004-172950 A | 6/2004 |
| JP | 2004-312472 A | 11/2004 |
| JP | 2004-343529 A | 12/2004 |
| JP | 2005-005911 A | 1/2005 |
| JP | 2005-094240 A | 4/2005 |
| JP | 2006-148328 A | 6/2006 |

* cited by examiner

SOLID-STATE IMAGE SENSOR AND IMAGING SYSTEM

CROSS REFERENCE TO RELATED APPLICATION

This application is a division of U.S. application Ser. No. 11/960,886, filed on Dec. 20, 2007, the entire disclosure of which is hereby incorporated by reference herein.

BACKGROUND OF THE INVENTION

1. Field of the Invention

The present invention relates to a solid-state image sensor and an imaging system including it.

2. Description of the Related Art

Solid-state image sensors such as a CMOS image sensor have been studied to decrease the number of elements (e.g., MOS transistors) which form a pixel, in order to downsize the pixel. As one method, Japanese Patent Laid-Open No. 2004-343529 proposes an arrangement in which a selection transistor for selecting a pixel is omitted. In this arrangement, a pixel is selected by controlling the voltage of a floating diffusion (to be referred to as an FD hereinafter) coupled to the gate of an amplifier MOS transistor. In the arrangement described in Japanese Patent Laid-Open No. 2004-343529, the FD voltage is reset in the readout period during which a signal is read out from each pixel to a column circuit arranged on each column. This readout period is a horizontal blanking period.

In the solid-state image sensor, the frame rate decreases as the readout period (horizontal blanking period) becomes longer. According to this pixel selection method, the FD voltage of pixels on a selected row needs to be set high, and that of pixels on an unselected row needs to be set low. Before reading out signals from pixels belonging to a selected row, a low voltage (selection disable voltage) needs to be applied to the FDs of all pixels. Then, a high voltage (selection enable voltage) needs to be applied to the FDs of pixels on a selected row.

A relatively long time is taken to set the voltage of an entire voltage supplying line to a selection disable voltage level. If this time is long, this means that the pixel selection disable period occupies a large proportion of the time taken to read out signals from all pixels. This problem is more serious in an application requested of high frame rate or a case where the imaging plane becomes large to increase the resistance or parasitic capacitance of a voltage supplying line. In particular, the HD (High Definition) standard requires an output of 60 frames per sec, and strong demand has arisen for solving this problem.

SUMMARY OF THE INVENTION

The present invention has been made to overcome the conventional drawbacks, and has as its object to provide a solid-state image sensor advantageous to high-speed readout of a signal.

The first aspect of the present invention is directed to a solid-state image sensor including a pixel array in which a plurality of pixels are two-dimensionally arrayed, a vertical scanning circuit which selects a row of the pixel array, and a horizontal scanning circuit which selects a column of the pixel array. Each pixel includes a photo-electric converter, transfer switch, charge-voltage conversion node, amplifier, and control switch. The transfer switch transfers charges from the photo-electric converter to the charge-voltage conversion node. The amplifier outputs, to the vertical signal line of a column to which the pixel belongs, a signal corresponding to the charges transferred to the charge-voltage conversion node. The control switch controls the voltage of the charge-voltage conversion node. The solid-state image sensor comprises a voltage controller which controls the voltage of the charge-voltage conversion node of each pixel via the control switch of the pixel. A voltage set at the charge-voltage conversion node by the voltage controller via the control switch includes the first voltage for setting a pixel in a selected state, and the second voltage for setting the pixel in an unselected state. The voltage controller and the control switch of each pixel set the voltage of the charge-voltage conversion node of each pixel to the second voltage by using at least part of the horizontal scanning period.

The second aspect of the present invention is directed to an imaging system and the system comprises a solid-state image sensor as defined above and a signal processing circuit which processes a signal output from the solid-state image sensor.

Further features of the present invention will become apparent from the following description of exemplary embodiments with reference to the attached drawings.

DESCRIPTION OF THE EMBODIMENTS

A preferred embodiment of the present invention will be described below with reference to the accompanying drawings.

Figure 1:
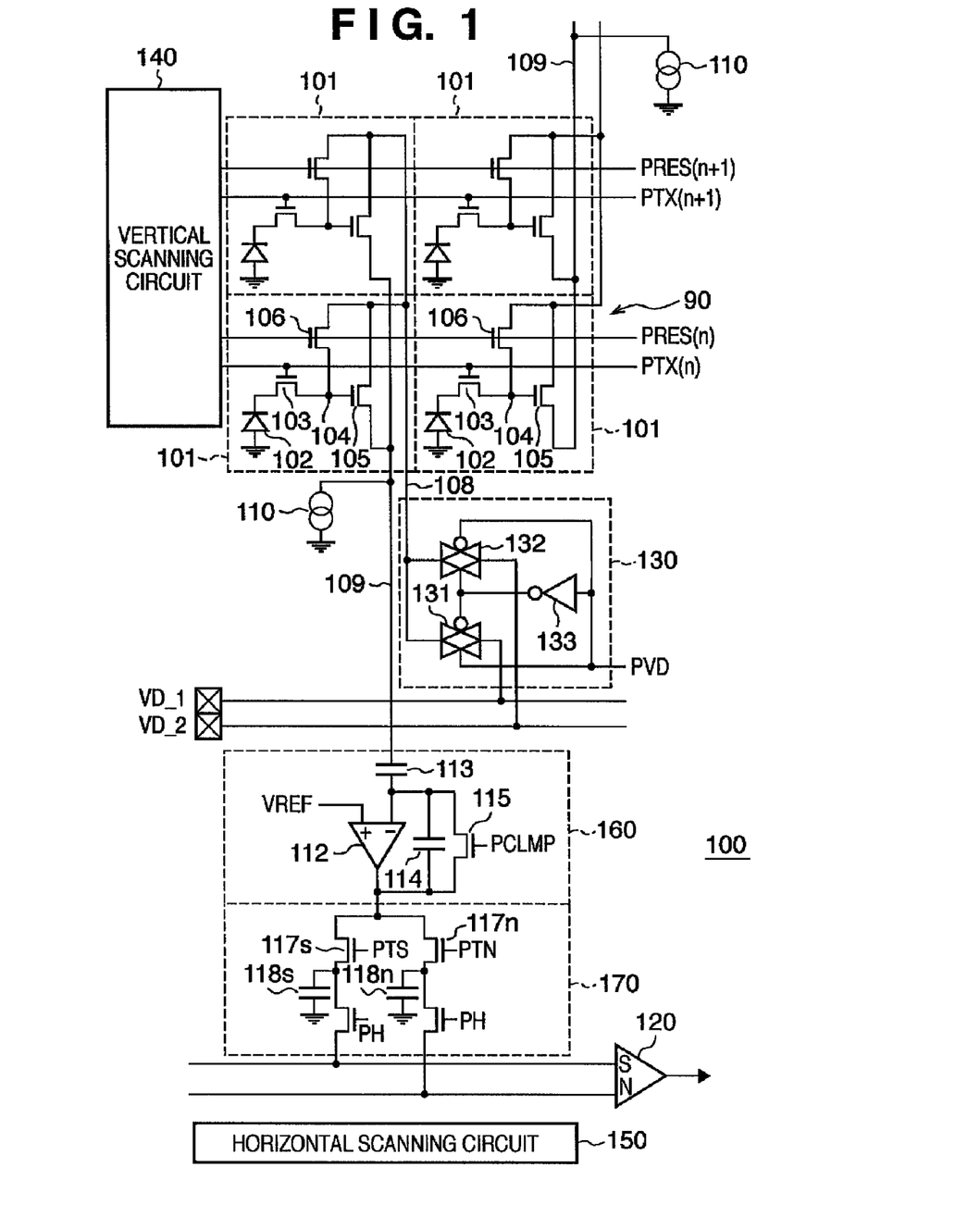
FIG. 1 is a circuit diagram schematically showing the arrangement of a solid-state image sensor according to a preferred embodiment of the present invention.

FIG. 1 is a circuit diagram schematically showing the arrangement of a solid-state image sensor according to the preferred embodiment of the present invention. A solid-state image sensor 100 according to the preferred embodiment of the present invention comprises a pixel array 90 in which a plurality of pixels 101 are two-dimensionally arrayed, a vertical scanning circuit 140 which selects a row of the pixel array 90, and a horizontal scanning circuit 150 which selects a column of the pixel array 90. The solid-state image sensor 100 comprises column amplifiers 160 and capacitance units 170 which are arranged on respective columns of the pixel array 90. The solid-state image sensor 100 also comprises an output amplifier 120 which amplifies a signal input from the capacitance unit of a column selected by the horizontal scanning circuit 150.

In the example shown in FIG. 1, the pixel array 90 is made up of only four pixels 101 arranged on two rows and two columns. The actual pixel array 90 can be made up of a larger number of pixels 101. Each pixel 101 includes a photo-electric converter 102, transfer switch 103, amplifier 105, and control switch (reset switch) 106.

The photo-electric converter 102 photo-electrically converts incident light into charges. The photo-electric converter 102 is typically formed from a photodiode. The transfer switch 103 transfers charges from the photo-electric converter 102 to a charge-voltage conversion node 104. The transfer switch 103 is typically formed from a MOS transistor. The transfer switch 103 transfers charges from the photo-electric converter 102 to the charge-voltage conversion node 104 in response to activation of a transfer pulse PTX driven by the vertical scanning circuit 140. The charge-voltage conversion node 104 has a capacitance, and converts charges into a voltage by this capacitance. The charge-voltage conversion node 104 typically includes a floating diffusion region (FD) formed in a semiconductor substrate. The amplifier 105 outputs, to a vertical signal line 109 on a column to which the target pixel belongs, a signal corresponding to charges transferred to the charge-voltage conversion node 104. The amplifier 105 is typically formed from a MOS transistor (amplifier MOS transistor), and its gate is coupled to the charge-voltage conversion node 104. The control switch 106 controls or resets the voltage of the charge-voltage conversion node 104. The control switch 106 is typically formed from a MOS transistor (reset MOS transistor). The control switch 106 is turned on in response to activation of a reset signal PRES driven by the vertical scanning circuit 140, and controls the voltage of the charge-voltage conversion node 104.

The pixel 101 is defined as a circuit including the photo-electric converter 102, transfer switch 103, charge-voltage conversion node 104, amplifier 105, and control switch 106. In this case, at least two pixels may also share at least one of the charge-voltage conversion node 104, amplifier 105, and control switch 106.

In the example shown in FIG. 1, the drain of an amplifier MOS transistor which forms the amplifier 105, and that of a reset MOS transistor which forms the control switch 106 are coupled to a voltage supplying line 108. The voltage of the voltage supplying line 108 is driven by a voltage controller 130.

The vertical signal line 109 is coupled to a constant current source 110. A source follower circuit is made up of the constant current source 110, and an amplifier MOS transistor which forms the amplifier 105 of the pixel 101 belonging to a selected row.

In the example shown in FIG. 1, a lower column amplifier 160 in FIG. 1 amplifies a signal read out via the vertical signal line 109 on an odd-numbered column. An upper column amplifier 160 (not shown) in FIG. 1 amplifies a signal read out via the vertical signal line 109 on an even-numbered column.

In the first embodiment, a voltage set at the charge-voltage conversion node 104 by the voltage controller 130 via the control switch 106 includes a first voltage VD_1 for setting a pixel in a selected state, and a second voltage VD_2 for setting the pixel in an unselected state. The voltage controller 130 and the control switch 106 of each pixel 101 set the voltage of the charge-voltage conversion node 104 of each pixel 101 to the second voltage VD_2 by using at least part of the horizontal scanning period. A voltage drop may occur across the MOS transistor when the voltage level upon activation of the reset signal PRES is lower by the threshold of the control switch 106 than that of the voltage supplying line 108. The voltage levels of the reset signal PRES and voltage supplying line 108 are determined to prevent the voltage drop.

When the amplifier 105 is formed from an NMOS transistor, the first voltage VD_1 is set higher than the second voltage VD_2. When the amplifier 105 is formed from a PMOS transistor, the first voltage is set lower than the second voltage.

The voltage controller 130 switches a voltage to be supplied to the voltage supplying line 108 between the first voltage VD_1 and the second voltage VD_2 in accordance with a voltage switching signal PVD. The voltage controller 130 includes, for example, a first transmission gate 131, second transmission gate 132, and inverter 133. The input of the first transmission gate 131 receives the first voltage VD_1, and that of the second transmission gate 132 receives the second voltage VD_2. The outputs of the first transmission gate 131 and second transmission gate 132 are coupled to the voltage supplying line 108. When the voltage switching signal PVD is at high level, the first transmission gate 131 is ON, and the first voltage VD_1 is supplied to the voltage supplying line 108. When the voltage switching signal PVD is at low level, the second transmission gate 132 is ON, and the second voltage VD_2 is supplied to the voltage supplying line 108.

The column amplifier 160 includes, for example, a differential amplifier 112, input capacitance 113, feedback capacitance 114, and clamp control switch 115. The column amplifier 160 in this example can obtain an inverting gain at the ratio of the input capacitance 113 and feedback capacitance 114.

While a noise level (N output) corresponding to the pixel reset state is output to the vertical signal line 109, a clamp pulse PCLMP changes to high level for only a predetermined period. When the clamp pulse PCLMP is at high level, a signal output from the column amplifier 160 becomes equal to a reference voltage VREF applied to the non-inverting input terminal of the differential amplifier 112. After the clamp pulse PCLMP returns to low level, a write signal PTN changes to high level for only a predetermined period. As a result, the noise level (N output) corresponding to the reset state of the pixel 101 is written in a holding capacitance 118$n$ via a write switch 117$n$.

Then, the transfer pulse PTX is activated to turn on the transfer switch 103 for only a predetermined period. In response to this, charges in the photo-electric converter 102 are transferred to the charge-voltage conversion node 104 via the transfer switch 103. The amplifier 105 outputs, to the vertical signal line 109, a signal corresponding to the charges transferred to the charge-voltage conversion node 104. The column amplifier 160 outputs a signal level (S output) prepared by giving the above-mentioned inverting gain to a voltage change from the voltage at which the clamp pulse PCLMP is at low level. A write signal PTS changes to high level for only predetermined period, and the signal level (S output) is written in a holding capacitance 118$s$ via a write switch 117$s$.

In the horizontal scanning period, a pixel signal is output by horizontal scanning. That is, the noise level (N output) and signal level (S output) of a column sequentially selected by the horizontal scanning circuit 150 are output from the holding capacitances 118$n$ and 118$s$ to the output amplifier (differential amplifier) 120. The output amplifier (differential amplifier) 120 calculates and outputs the difference between the signal level (S output) and the noise level (N output).

The vertical scanning circuit 140 scans selected rows, and the readout operation is repeated, obtaining readout outputs from all the rows of the pixel array 90.

Note that the power supply voltage can be set to, e.g., 3.3 V, the high level of the first voltage VD_1 can be set to, e.g., 3.3 V, and the second voltage VD_2 can be set to, e.g., 0.3 V to 1.0 V.

The operation of the solid-state image sensor 100 shown in FIG. 1 will be explained. As a comparative example, a case where the charge-voltage conversion node 104 of the pixel 101 on an unselected row is reset during the pixel readout period (horizontal blanking period) will be described with reference to FIG. 2. The pixel readout period is a period during which a signal is read out from the pixel array 90 by the column amplifier 160 via the vertical signal line 109, and stored in the capacitance unit 170, that is, a period between horizontal scanning periods. Hence, the pixel readout period is equivalent to the horizontal blanking period.

Figure 2:
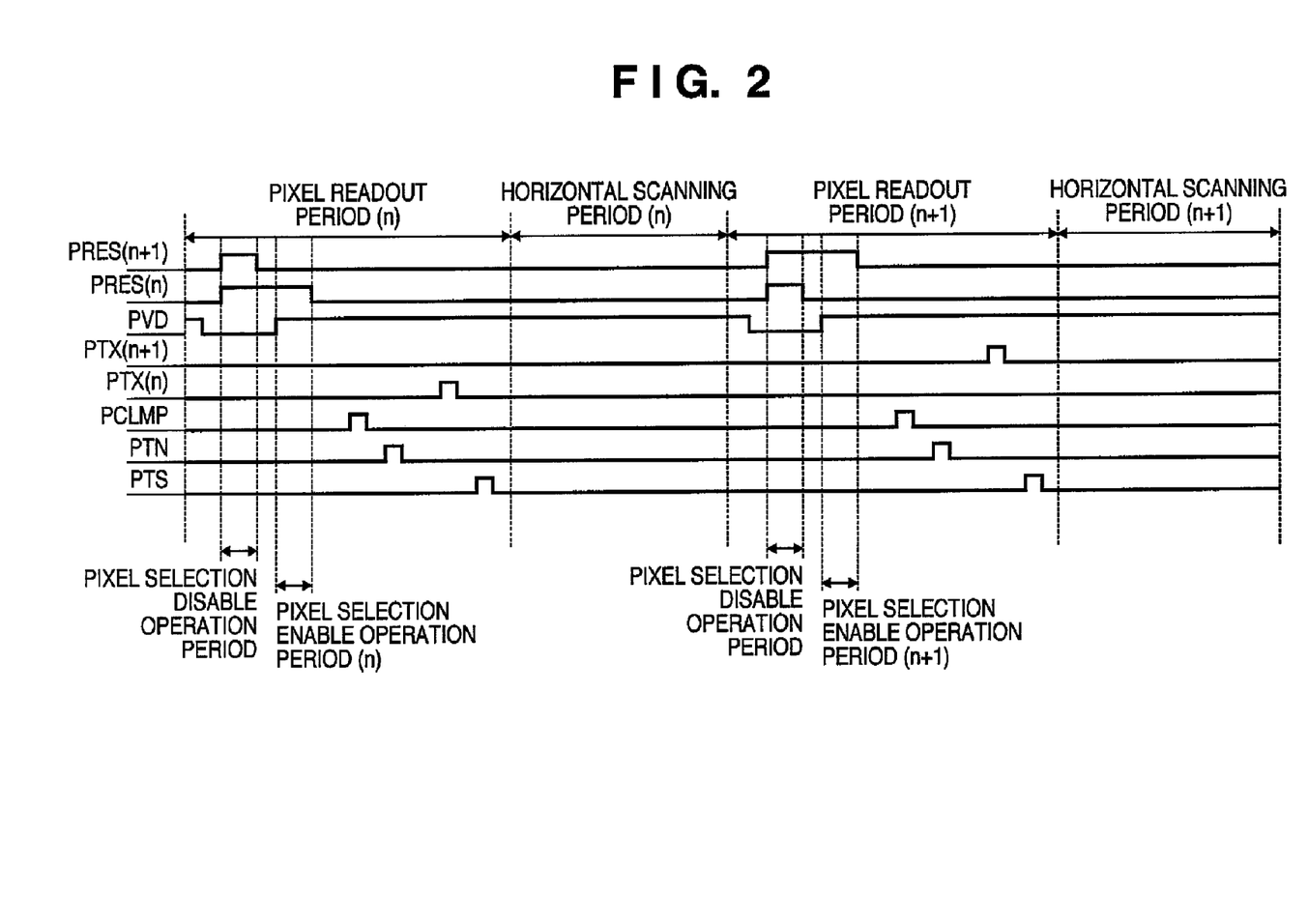
FIG. 2 is a timing chart showing a comparative operation example.

PRES(n) and PRES(n+1) represent reset signals PRES for controlling pixels on the nth and (n+1)th rows driven by the vertical scanning circuit 140. PTX(n) and PTX(n+1) represent transfer pulses PTX for controlling pixels on the nth and (n+1)th rows driven by the vertical scanning circuit 140. Assume that all MOS transistors in the pixel 101 are NMOS transistors.

In the pixel selection disable operation period, the voltage switching signal PVD changes to low level to supply the selection disable second voltage VD_2 to the voltage supplying line 108. The vertical scanning circuit 140 activates the reset signals PRES(n) and PRES(n+1) for all rows to high level. In response to this, the second voltage VD_2 is applied to the charge-voltage conversion nodes 104 of all pixels in the pixel array 90 via the voltage supplying lines 108 and control switches 106. The charge-voltage conversion nodes 104 of all pixels are reset to the second voltage VD_2.

In the pixel selection enable operation period, the reset signal PRES(n+1) for an unselected row changes to low level, and the control switches (reset switches) 106 of the pixels 101 on the unselected row are turned off. The voltage switching signal PVD changes to high level to supply the pixel selecting first voltage VD_1 to the voltage supplying line 108. Then, the voltage of the voltage supplying line 108 changes to the first voltage VD_H. At this time, the reset signal PRES(n) for a selected row keeps high level. Thus, the first voltage VD_1 is applied via the voltage supplying lines 108 and control switches 106 to the charge-voltage conversion nodes 104 of the pixels 101 on the selected row. The charge-voltage conversion nodes 104 of the pixels 101 on the selected row are reset to the first voltage VD_1. At this time, the pixels 101 on the selected row output signals corresponding to the pixel reset state to the vertical signal lines 109.

As described above, while a signal (reset signal) corresponding to the pixel reset state of each pixel 101 on the nth row is output to the vertical signal line 109, the clamp pulse PCLMP changes to high level for only a predetermined period. Thereafter, the clamp pulse PCLMP returns to low level, and the write signal PTN changes to high level for only a predetermined period. The noise level (N output) corresponding to the reset state of the pixel 101 is written in the holding capacitance 118n via the write switch 117n.

Then, the transfer pulse PTX(n) is activated to turn on the transfer switch 103 for only a predetermined period. In response to this, charges in the photo-electric converter 102 are transferred to the charge-voltage conversion node 104 via the transfer switch 103. A signal corresponding to the charges is output to the vertical signal line 109. The column amplifier 160 outputs a signal level (S output) prepared by giving the above-mentioned inverting gain to a voltage change from the voltage at which the clamp pulse PCLMP is at low level. The write signal PTS changes to high level for only a predetermined period, and the signal level (S output) is written in the holding capacitance 118s via the write switch 117s.

In the horizontal scanning period, the horizontal scanning operation is done for the nth row. That is, the noise level (N output) and signal level (S output) of a column sequentially selected by the horizontal scanning circuit 150 are output from the holding capacitances 118n and 118s to the output amplifier (differential amplifier) 120. The output amplifier (differential amplifier) 120 calculates and outputs the difference between the signal level (S output) and the noise level (N output).

According to this comparative example, the operation to set a row in an unselected state is executed during the horizontal blanking period. This prolongs the horizontal blanking period, which is disadvantageous to high-speed readout of a signal.

As an operation example in the preferred embodiment of the present invention, a case where the charge-voltage conversion node 104 of the pixel 101 on an unselected row is reset during the horizontal scanning period will be described with reference to FIG. 3.

Figure 3:
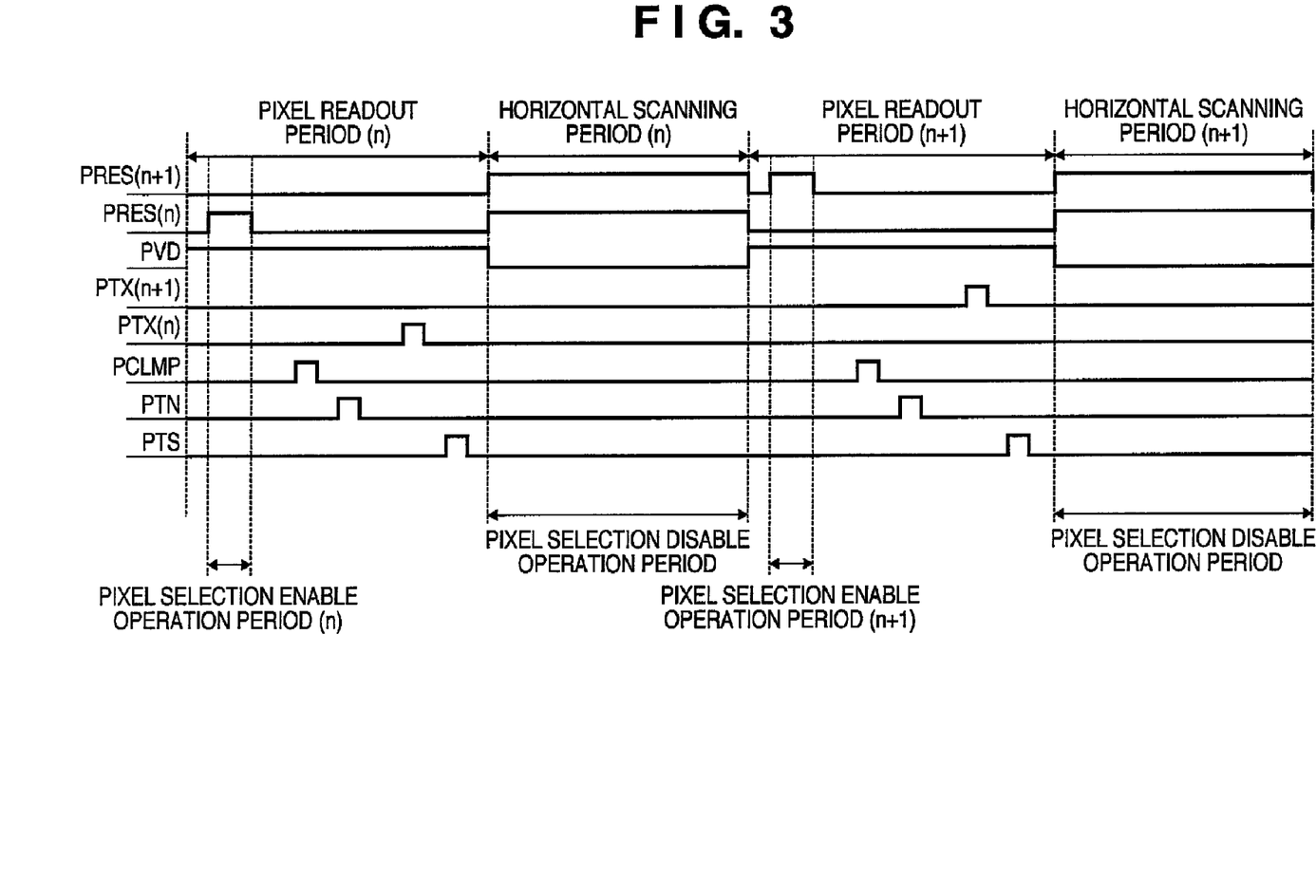
FIG. 3 is a timing chart showing an operation example according to the preferred embodiment of the present invention.

In the preferred embodiment of the present invention, as illustrated in FIG. 3, the voltage switching signal PVD changes to low level to supply the selection disable second voltage VD_2 to the voltage supplying line 108 during at least part of the horizontal scanning period of pixels on the nth row. The vertical scanning circuit 140 activates the reset signals PRES(n) and PRES(n+1) for all rows to high level. In response to this, the second voltage VD_2 is applied to the charge-voltage conversion nodes 104 of all pixels in the pixel array 90 via the voltage supplying lines 108 and control switches 106. That is, in at least part of the horizontal scanning period, the charge-voltage conversion nodes 104 of all pixels in the pixel array 90 are reset to the second voltage VD_2.

In the subsequent pixel readout period of the (n+1)th row, the voltage switching signal PVD changes to high level to supply the pixel selecting first voltage VD_1 to the voltage supplying line 108. In the pixel readout period of the (n+1)th row, the reset signal PRES(n) for an unselected row is deactivated to low level, and the reset signal PRES(n+1) for a selected row is activated to high level for only a predetermined period. Then, the control switches 106 of the pixels 101 on the unselected row are turned off, and those of the pixels 101 on the selected row are turned on for only a predetermined period. The charge-voltage conversion nodes 104 of the pixels 101 on the selected (n+1)th row receive the first voltage VD_1 via the voltage supplying lines 108 and control switches 106, and are reset to the first voltage VD_1.

As described above, while a signal (reset signal) corresponding to the pixel reset state of each pixel 101 on the (n+1)th row is output to the vertical signal line 109, the clamp pulse PCLMP changes to high level for only a predetermined period. Then, the clamp pulse PCLMP returns to low level, and the write signal PTN changes to high level for only a predetermined period. The noise level (N output) corresponding to the reset state of the pixel 101 is written in the holding capacitance 118n via the write switch 117n.

After that, the transfer pulse PTX(n+1) is activated to turn on the transfer switch 103 for only a predetermined period. In response to this, charges in the photo-electric converter 102 are transferred to the charge-voltage conversion node 104 via the transfer switch 103. A signal corresponding to the charges is output to the vertical signal line 109. The column amplifier 160 outputs a signal level (S output) prepared by giving the above-mentioned inverting gain to a voltage change from the voltage at which the clamp pulse PCLMP is at low level. The write signal PTS changes to high level for only a predetermined period, and the signal level (S output) is written in the holding capacitance 118s via the write switch 117s.

In the horizontal scanning period, the horizontal scanning operation is done for the (n+1)th row. That is, the noise level (N output) and signal level (S output) of a column sequentially selected by the horizontal scanning circuit 150 are output from the holding capacitances 118n and 118s to the output amplifier (differential amplifier) 120. The output amplifier (differential amplifier) 120 calculates and outputs the difference between the signal level (S output) and the noise level (N output).

By resetting the charge-voltage conversion node 104 of the pixel 101 on an unselected row during the horizontal scanning period, the horizontal blanking period can be shortened to read out a signal at higher speed as compared with the comparative example. As a result, for example, the frame rate can increase.

In the example shown in FIG. 3, the control switch 106 of each pixel is ON from the start to the end of the entire horizontal scanning period. During the entire period, the voltage controller 130 drives the charge-voltage conversion node 104 of each pixel at the second voltage via the control switch 106 of the pixel. This can prevent the selection disable operation from interfering with horizontal scanning, more specifically, noise generated by the selection disable operation from mixing in the signal of a pixel on a specific column in the horizontal scanning period. Generation of fixed pattern noise can be prevented.

The voltage switching signal PVD may also be supplied from outside the solid-state image sensor 100 or generated within the solid-state image sensor 100. In the former case, the circuit arrangement can be simplified to reduce the chip size. In the latter case, the number of pads can be reduced to downsize the mounting board.

Figure 7:
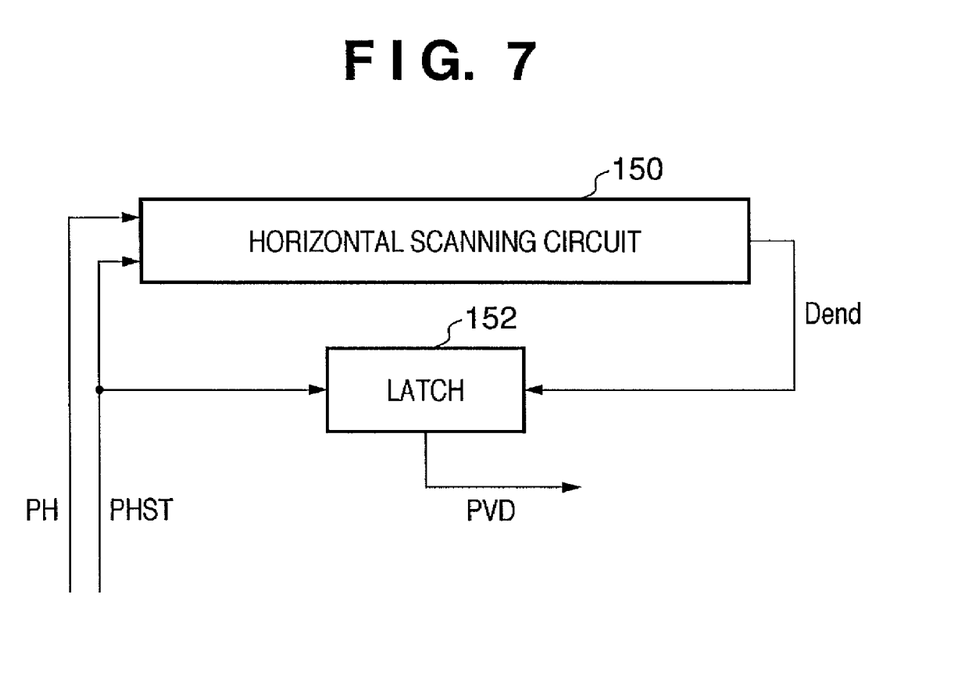
FIG. 7 is a block diagram showing an arrangement of a control signal generation circuit for generating a control signal PVD in the solid-state image sensor.
Figure 8:
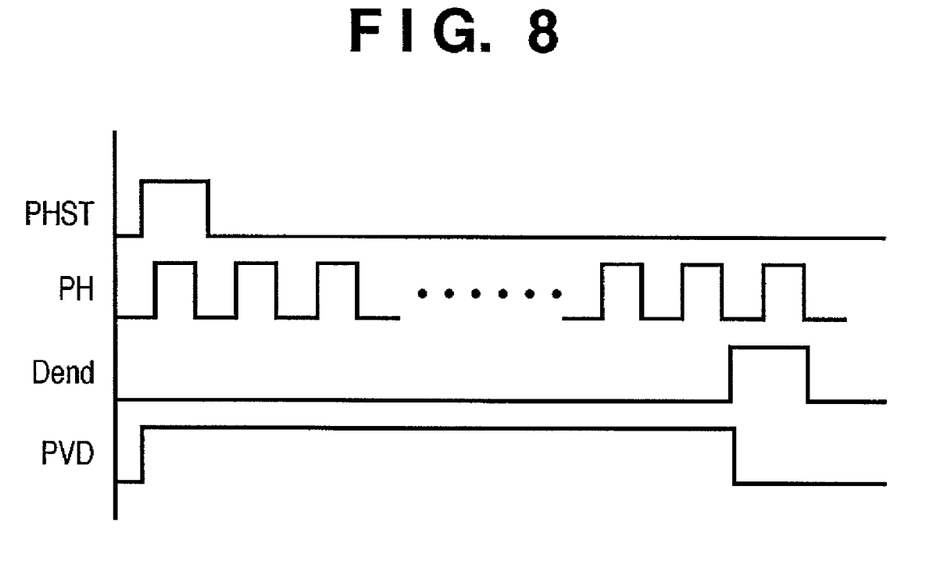
FIG. 8 is a timing chart showing change of a signal in the control signal generation circuit illustrated in FIG. 7.

FIG. 7 is a block diagram showing an arrangement of a control signal generation circuit for generating the control signal PVD in the solid-state image sensor 100. FIG. 8 is a timing chart showing change of a signal in the control signal generation circuit. The horizontal scanning circuit 150 is formed from a shift register. The horizontal scanning circuit 150 receives a scanning start signal PHST as a pulse signal in accordance with a scanning pulse (scanning clock) PH, and shifts the pulse signal in accordance with the scanning pulse (scanning clock) PH. After shifting the pulse signal to the final stage, the horizontal scanning circuit 150 outputs a scanning end signal Dend. A latch circuit 152 generates the voltage switching signal PVD which changes to high level in response to activation of the scanning start signal PHST and low level in response to activation of the scanning end signal Dend.

Figure 4:
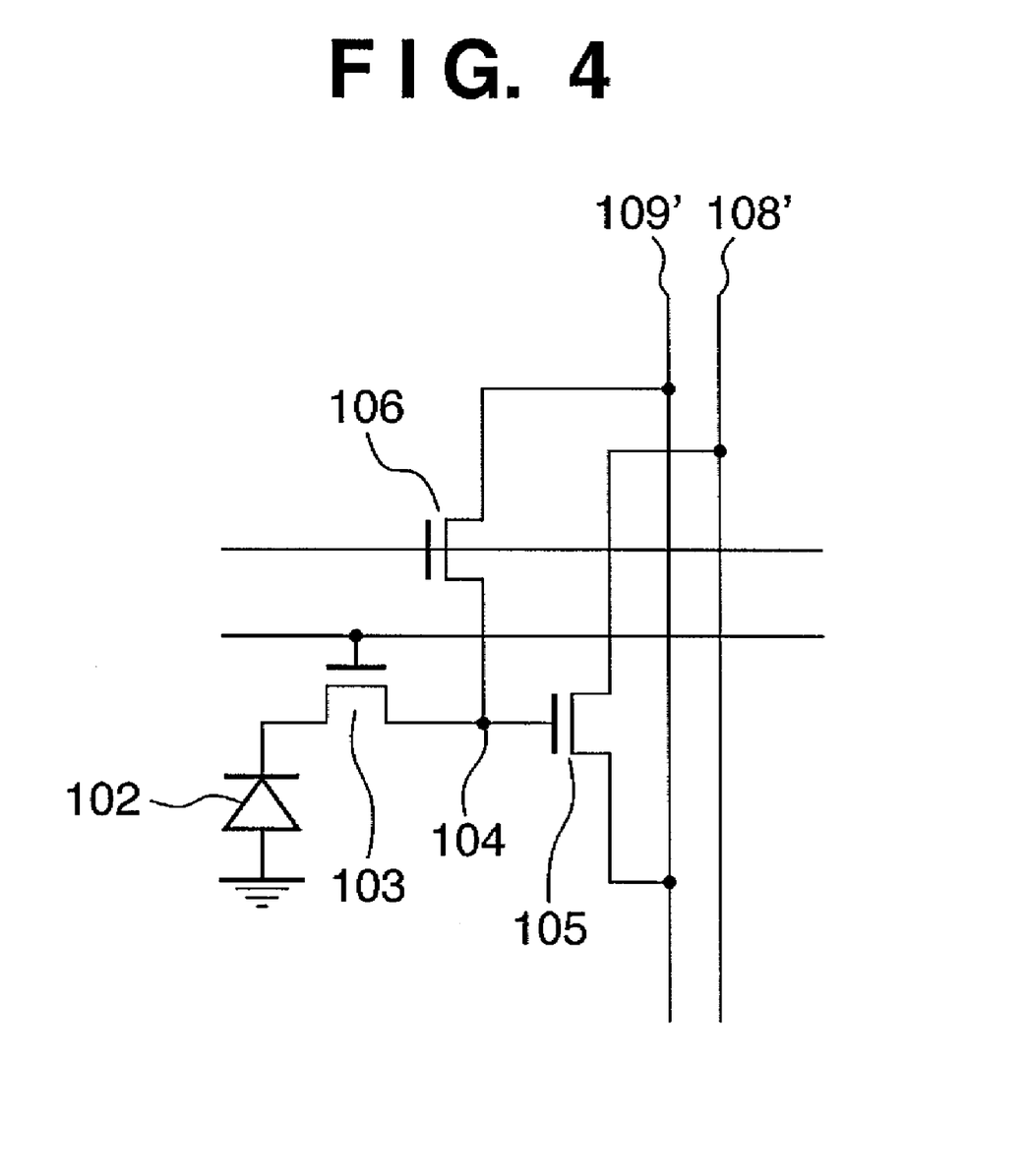
FIG. 4 is a circuit diagram showing a pixel arrangement according to a modification.

In the pixel 101 illustrated in FIG. 1, the voltage supplying line 108 is commonly coupled to the drains of the control switch (reset MOS transistor) 106 and amplifier (amplifier MOS transistor) 105. Instead of this arrangement, the present invention can also adopt the following modification. FIG. 4 is a circuit diagram showing a pixel arrangement according to the first modification. In this modification, the drain of the control switch (reset MOS transistor) 106 is coupled to a vertical signal line 109'. In this arrangement example, the voltage controller 130 suffices to drive the vertical signal line 109'. While a signal from the pixel 101 is output to the vertical signal line 109', the voltage controller 130 needs to be electrically disconnected from the vertical signal line 109'. The voltage of a voltage supplying line 108' coupled to the drain of the amplifier 105 is fixed.

The present invention is also applicable to an arrangement in which a plurality of photo-electric converters 102 share at least one of the transfer switch 103, control switch 106, amplifier 105, and charge-voltage conversion node 104.

Figure 5:
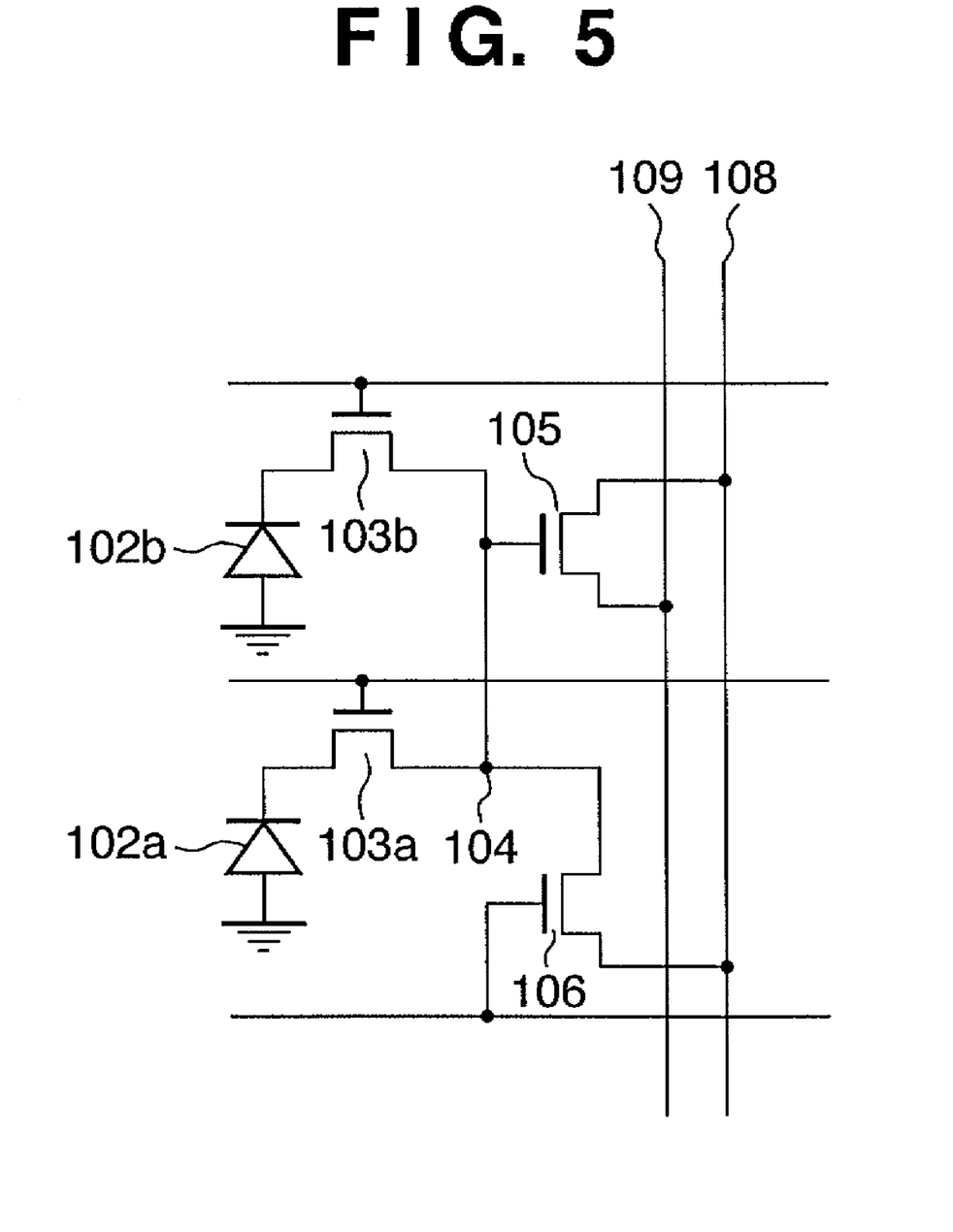
FIG. 5 is a circuit diagram showing a pixel arrangement according to another modification.

In the second modification shown in FIG. 5, two photo-electric converters 102a and 102b share the amplifier 105 and control switch 106. Transfer switches 103a and 103b are arranged in correspondence with the photo-electric converters 102a and 102b.

Figure 6:
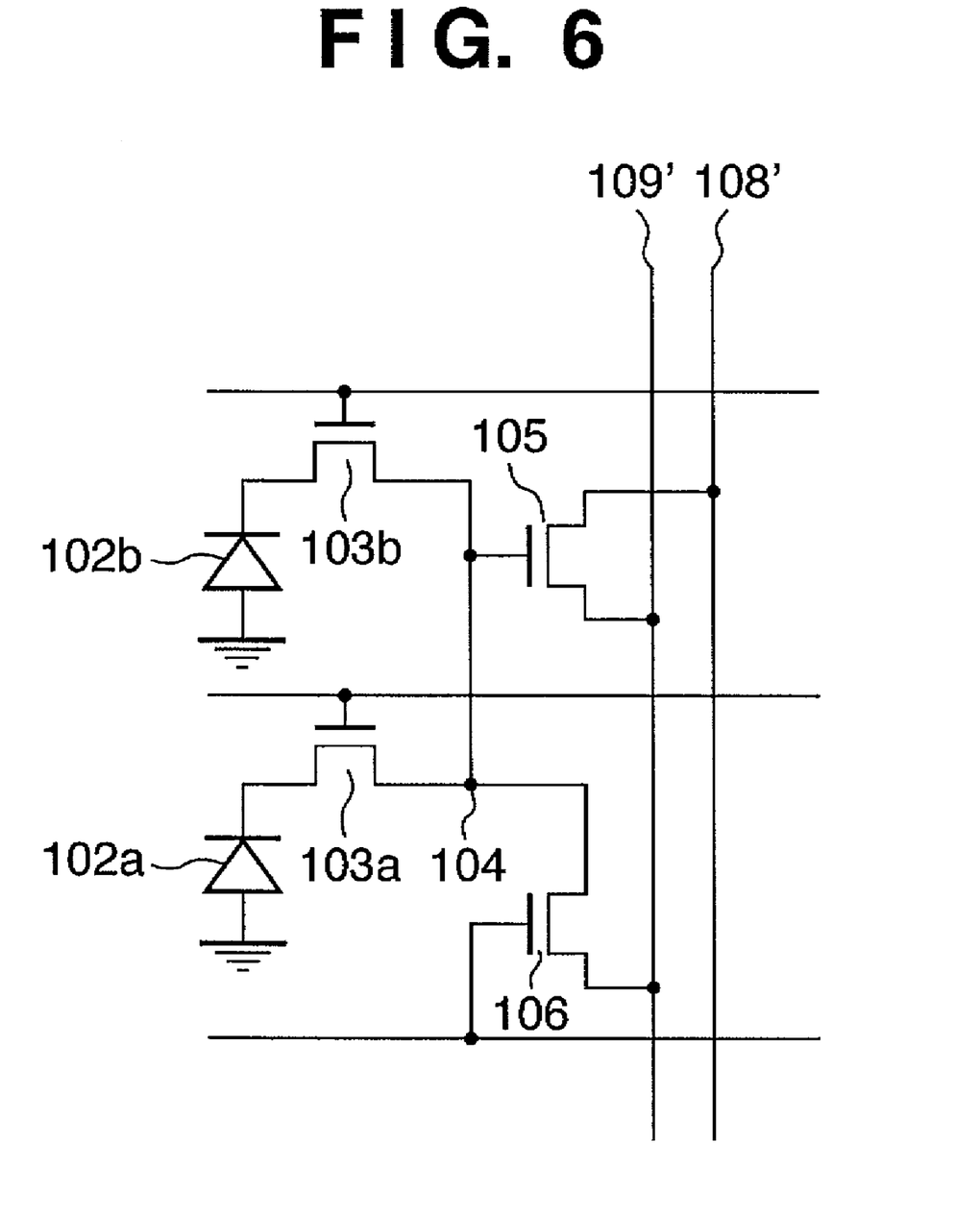
FIG. 6 is a circuit diagram showing a pixel arrangement according to still another modification.

Also in the third modification shown in FIG. 6, two photo-electric converters 102a and 102b similarly share the amplifier 105 and control switch 106. Transfer switches 103a and 103b are arranged in correspondence with the photo-electric converters 102a and 102b.

Figure 9:
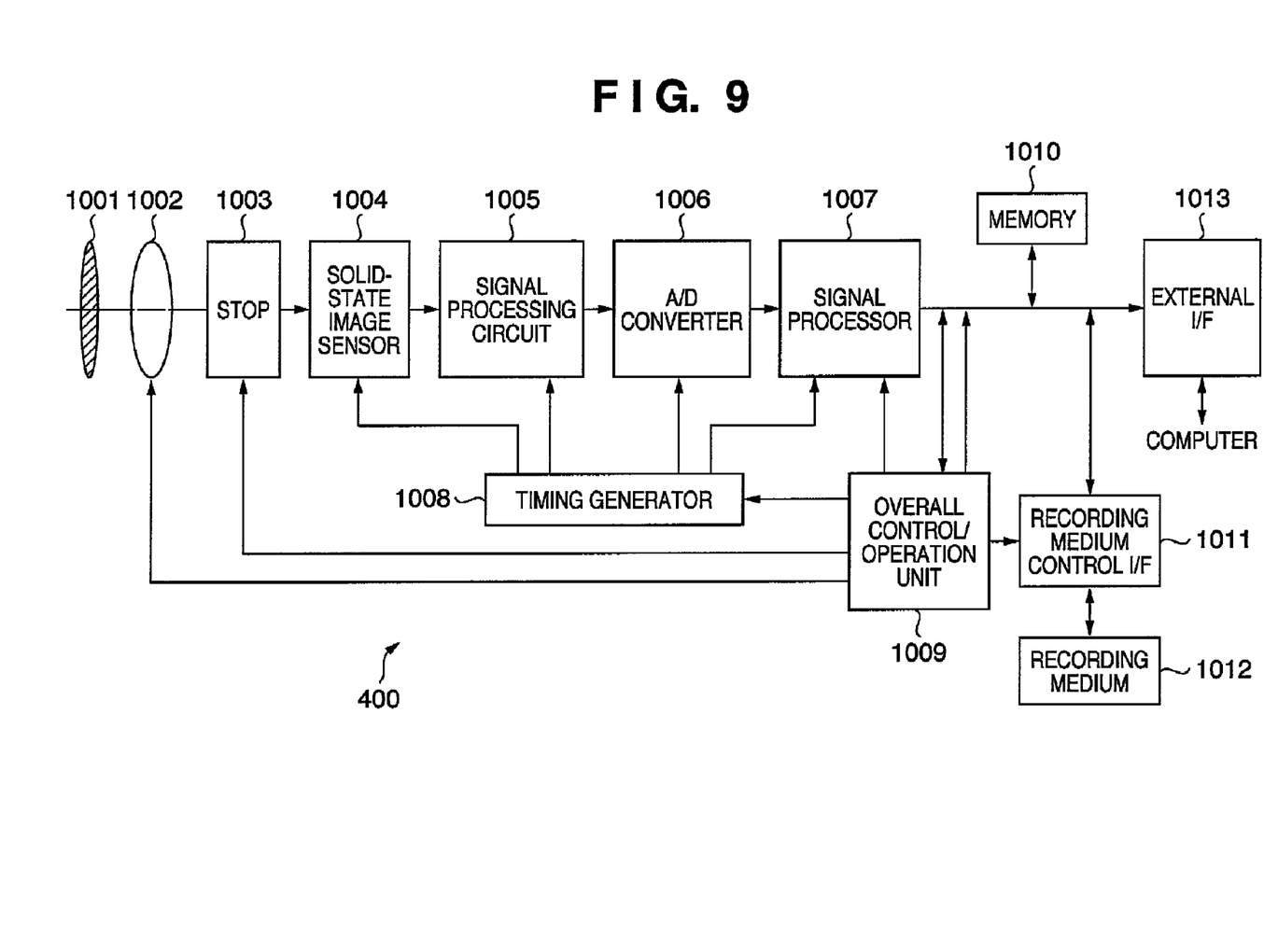
FIG. 9 is a block diagram showing the configuration of an imaging system.

FIG. 9 is a block diagram showing the schematic configuration of an imaging system according to a preferred embodiment of the present invention. An imaging system 400 comprises the above-described solid-state image sensor 100.

A lens 1002 forms an optical image of an object on the imaging plane of the solid-state image sensor 100. The outer surface of the lens 1002 is covered with a barrier 1001 which protects the lens 1002 and also serves as a main switch. The lens 1002 has a stop 1003 to adjust the quantity of light passing through the lens 1002. A signal processing circuit 1005 performs various processes such as correction and clamping for an imaging signal output from the solid-state image sensor 100. An A/D converter 1006 analog-to-digital-converts an imaging signal output from the signal processing circuit 1005. A signal processor 1007 performs various processes such as correction and data compression for image data output from the A/D converter 1006. The solid-state image sensor 100, signal processing circuit 1005, A/D converter 1006, and signal processor 1007 operate in accordance with timing signals generated by a timing generator 1008.

The blocks 1005 to 1008 may also be formed on the same chip as that of the solid-state image sensor 100. An overall control/operation unit 1009 controls the blocks of the imaging system 400. The imaging system 400 comprises a memory 1010 for temporarily storing image data, and a recording medium control interface 1011 for recording/reading out an image on/from a recording medium. A recording medium 1012 includes a semiconductor memory and the like and is detachable. The imaging system 400 may comprise an external interface (I/F) 1013 for communicating with an external computer or the like.

The operation of the imaging system 400 shown in FIG. 9 will be described. In response to opening of the barrier 1001, the main power supply, the power supply of the control system, and the power supply of the imaging circuit including the A/D converter 1006 are sequentially turned on. To control the exposure, the overall control/operation unit 1009 sets the stop 1003 to the full-aperture state. A signal output from the solid-state image sensor 100 enters the A/D converter 1006 through the signal processing circuit 1005. The A/D converter 1006 A/D-converts the signal and outputs it to the signal processor 1007. The signal processor 1007 processes the data and supplies it to the overall control/operation unit 1009. The overall control/operation unit 1009 calculates and determines the exposure. The overall control/operation unit 1009 controls the stop based on the determined exposure.

The overall control/operation unit 1009 extracts a high-frequency component from the signal which is output from the solid-state image sensor 100 and processed by the signal processor 1007. The overall control/operation unit 1009 calculates the distance to the object based on the high-frequency component. The overall control/operation unit 1009 drives the lens 1002 to determine whether the object is in focus. If the overall control/operation unit 1009 determines that the object is out of focus, it drives the lens 1002 again to calculate the distance.

After confirming that the object is in focus, actual exposure starts. After the end of exposure, an imaging signal output from the solid-state image sensor 100 undergoes correction and the like by the signal processing circuit 1005, is A/D-converted by the A/D converter 1006, and is processed by the signal processor 1007. The image data processed by the signal processor 1007 is stored in the memory 1010 by the overall control/operation unit 1009.

The image data stored in the memory 1010 is recorded on the recording medium 1012 via the recording medium control I/F under the control of the overall control/operation unit 1009. The image data can be provided to a computer or the like via the external I/F 1013 and processed by it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-356089, filed Dec. 28, 2006 which is hereby incorporated by reference herein in its entirety.

What is claimed is:

1. A driving method of driving a solid-state image sensor that includes a pixel array in which a plurality of pixels are two-dimensionally arrayed, a vertical scanning circuit that selects a row of the pixel array, and a horizontal scanning circuit that sequentially selects a column of a plurality of columns of the pixel array in a horizontal scanning period, each pixel including a photo-electric converter, a transfer switch that transfers charges from the photo-electric converter to a charge-voltage conversion node, an amplifier that outputs, to a vertical signal line of a column to which the pixel belongs, a signal corresponding to the charges transferred to the charge-voltage conversion node, the method comprising:

a first step of selecting an n-th row of the pixel array by the vertical scanning circuit, the selecting of the n-th row causing the amplifiers of the pixels of the n-th row to output signals to the vertical signal lines of the plurality of columns; and a second step of sequentially selecting a column of the plurality of columns of the pixel array by the horizontal scanning circuit during a horizontal scanning period for the n-th row, the second step including an unselecting step of supplying the charge-voltage conversion nodes of the pixels of the n-th row with a voltage that sets the charge-voltage conversion nodes of the pixels of the n-th row in a unselected state, during at least part of the horizontal scanning period for the n-th row, wherein the unselecting step includes supplying the charge-voltage conversion nodes of the pixels of the n-th row with the voltage that sets the charge-voltage conversion nodes of the pixels of the n-th row in the unselected state, during an entirety of the horizontal scanning period for the n-th row.

2. A driving method of driving a solid-state image sensor that includes a pixel array in which a plurality of pixels are two-dimensionally arrayed, a vertical scanning circuit that selects a row of the pixel array, and a horizontal scanning circuit that sequentially reads a signal of a column of a plurality of columns of the pixel array in a horizontal scanning period, each pixel including a photo-electric converter, a transfer switch that transfers charges from the photo-electric converter to a charge-voltage conversion node, an amplifier that outputs, to a vertical signal line of a column to which the pixel belongs, a signal corresponding to the charges transferred to the charge-voltage conversion node, the method comprising:

a first step of selecting an n-th row of the pixel array by the vertical scanning circuit, the selecting of the n-th row causing the amplifiers of the pixels of the n-th row to output signals to the vertical signal lines of the plurality of columns;

a second step of sequentially reading a signal of a column of the plurality of columns of the pixel array by the horizontal scanning circuit during a horizontal scanning period for the n-th row, the second step including an unselecting step of supplying the charge-voltage conversion nodes of the pixels of the n-th row with a voltage that sets the charge-voltage conversion nodes of the pixels of the n-th row in a unselected state, during at least part of the horizontal scanning period for the n-th row; and a third step of supplying the charge-voltage conversion nodes of the pixels of a row that is selected next to the n-th row with a voltage that sets the charge-voltage conversion nodes of the pixels of the row that is selected next to the n-th row in a selected state.

3. The method according to claim 2, wherein the unselecting step includes supplying the charge-voltage conversion nodes of the pixels of the n-th row with the voltage that sets the charge-voltage conversion nodes of the pixels of the n-th row in the unselected state, during an entirety of the horizontal scanning period for the n-th row.

* * * * *